Patented Aug. 7, 1934

1,969,463

UNITED STATES PATENT OFFICE 1,969,463

AZO DYESTUFF

Karl Holzach, Ludwigshafen-on-the-Rhine, and Guido von Rosenberg, Mannheim, Germany, assignors to General Aniline Works, Inc., New York, N. Y., a corporation of Delaware No Drawing. Application July 1, 1929, Serial No. 375,325. Renewed December 7, 1933. In Germany July 5, 1928

6 Claims. (Cl. 260—86)

The present invention relates to the production of azo dyestuffs containing 4-hydroxyquinolones as coupling components.

We have found that valuable azo dyestuffs are obtained by coupling diazo compounds free from sulphonic and carboxylic acid groups with quinolones also free from the said groups corresponding to the general formula:

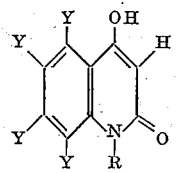

in which R stands for an alkyl, aralkyl or a cyclic radicle which may be substituted and Y for hydrogen or any substituent other than the sulfonic and carboxylic acid groups.

The new products are insoluble in water, and can be employed as pigment dyestuffs or for dyeing acetate silk, a large number of them having an extremely good affinity for acetate silk. For example, dyestuffs are obtained by coupling the diazo compounds of aniline or its homologues with N-methyl-4-hydroxy-2-quinolone, which give dyeings on acetate silk having valuable greenish yellow shades and excellent fastness properties, and which are also suitable for printing on acetate silk.

The shade of the dyestuff obtained can be varied within wide limits by appropriate choice of the diazo or coupling component employed. The azo dyestuffs obtained, when employing N-alkyl-4-hydroxyquinolone as coupling component, are of great value, in particular those obtainable from diazotized m-nitraniline.

The following examples will further illustrate the nature of the said invention, but the invention is not restricted to these examples. The parts are by weight.

Example 1

A diazo solution prepared in the usual manner from 6.2 parts of aniline is allowed to run at a temperature between 0° and 5° C. into a solution of 18 parts of N-phenyl-4-hydroxy-2-quinolone and 20 parts of sodium carbonate in 500 parts of water while stirring. After half an hour the whole is warmed up to 10° C. and stirred until the diazo compound is used up. The insoluble dyestuff has then separated out and is filtered off by suction. The dyestuff corresponding to the formula:

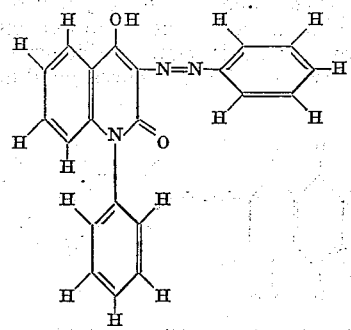

is a yellow powder which when triturated with the usual substrata, forms a pigment of good fastness properties. The preparation can also be carried out from the beginning in the presence of substrata.

Example 2

A diazo solution prepared in the usual manner from 9.2 parts of m-nitraniline is allowed to run at a temperature of from 5° to 10° C. into a suspension of 12 parts of N-methyl-4-hydroxy-2-quinolone in 500 parts of water to which 20 parts of sodium acetate have been added, and the whole is then stirred at from 10° to 15° C. until the diazo compound is used up. The dyestuff corresponding to the formula:

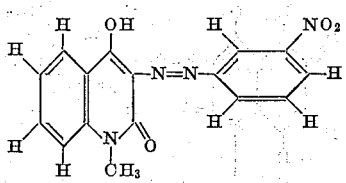

which separates out is filtered off by suction. It gives a strong, very fast, greenish yellow dyeing on acetate silk from a suspension in water with the usual additions.

Example 3

A diazo solution prepared in the usual manner from 12.8 parts of p-chloraniline is allowed to run at a temperature of about 10° C. into a solution of 21.5 parts of 6-chlor-N-ethyl-4-hydroxy-2-quinolone (obtainable by heating 5-chlor-2-ethylamino-1-benzoic acid with acetic acid anhydride) in 500 parts of a 2.2 per cent sodium carbonate solution to which 15 parts of sodium bicarbonate have been added and the whole is stirred at about 10° C. until the diazo compound is used up. The dyestuff corresponding to the formula:

[structure: 6-chloro-4-hydroxy-N-ethyl-2-quinolone-3-azo-4'-chlorobenzene]

which separates out is filtered off by suction. It gives a strong, very fast, yellow dyeing on acetate silk from an aqueous suspension with the usual additions.

*Example 4*

A diazo solution prepared in the usual manner from 13.6 parts of p-aminodimethylaniline is allowed to run at a temperature between about zero and 5° C. into a solution of 17.5 parts of N-methyl-4-hydroxy-2-quinolone and 20 parts of soda in 500 parts of water. The reaction mixture is stirred until the diazo compound is used up. The insoluble dyestuff formed corresponding to the formula:

[structure: N-methyl-4-hydroxy-2-quinolone-3-azo-4'-dimethylaminobenzene]

is filtered by suction and is a violet brown powder when dried. It has a good affinity to acetate silk which is dyed violet shades from its aqueous suspension.

*Example 5*

A diazo solution prepared in the usual manner from 13.8 parts of m-nitraniline are run at a temperature of about zero into a solution of 27 parts of N-(2'-methoxyphenyl)-4-hydroxy-2-quinolone (obtainable by heating N-(2'-methoxyphenyl)-anthranilic acid with acetic acid anhydride) and 30 parts of soda in 500 parts of water. After the diazo compound has been consumed, the dyestuff corresponding to the formula:

[structure: N-(2'-methoxyphenyl)-4-hydroxy-2-quinolone-3-azo-3'-nitrobenzene]

is filtered by suction. It forms a water-insoluble yellow powder when dried and is a pigment of good fastness properties, when ground with the usual substrata. The production of the pigment may also be carried out by producing the dyestuff in the presence of a substratum.

What we claim is:—

1. Azo dyestuffs free from acid groups comprising as coupling component a quinolone corresponding to the general formula:

[structure: 4-hydroxy-2-quinolone with Y substituents and N-R]

in which R stands for an alkyl, aralkyl or cyclic radicle, and Y for hydrogen or halogen.

2. Azo dyestuffs free from acid groups comprising as coupling component a quinolone corresponding to the formula:

[structure: 4-hydroxy-2-quinolone with N-R]

in which R stands for an alkyl group.

3. The azo dyestuffs corresponding to the formula:

[structure: 4-hydroxy-N-R-2-quinolone-3-azo-2'-nitrobenzene]

in which R stands for an alkyl group.

4. The azo dyestuff corresponding to the formula:

[structure: 4-hydroxy-N-methyl-2-quinolone-3-azo-2'-nitrobenzene]

giving a strong, very fast, greenish yellow dyeing on acetate silk.

5. Azo dyestuffs free from acid groups comprising as a coupling component a quinolone corresponding to the formula:

[structure: 4-hydroxy-2-quinolone with Y and N-R]

wherein R stands for an alkyl group or a phenyl group and Y stands for a hydrogen or halogen atom.

6. Azo dyestuffs corresponding to the general formula:

[structure: 4-hydroxy-2-quinolone-3-azo-benzene with Y, X substituents and N-R]

wherein R stands for an alkyl group or a phenyl group, Y stands for a hydrogen or halogen atom, and X stands for hydrogen, halogen, a nitro group or an amino group substituted by an alkyl group.

KARL HOLZACH.
GUIDO VON ROSENBERG.